United States Patent [19]

Dück et al.

[11] Patent Number: 4,973,066
[45] Date of Patent: Nov. 27, 1990

[54] PISTON RING

[75] Inventors: Gerhard Dück, Burscheid; Hans-Rainer Brillert, Odenthal; Albin Mierbach; Wolfgang Schmelter, both of Leverkusen, all of Fed. Rep. of Germany

[73] Assignee: Goetze AG, Burscheid, Fed. Rep. of Germany

[21] Appl. No.: 736,542

[22] Filed: May 21, 1985

[30] Foreign Application Priority Data

May 23, 1984 [DE] Fed. Rep. of Germany ....... 3419241

[51] Int. Cl.$^5$ .............................. F16J 9/20; F16J 9/22
[52] U.S. Cl. ...................... 277/173; 277/216
[58] Field of Search ............... 277/216, 236, 173, 172, 277/171, 170; 92/193, 201, 206, 207

[56] References Cited

U.S. PATENT DOCUMENTS

| 2,177,700 | 10/1939 | Fisher | 277/216 |
| 2,292,042 | 8/1942 | Bowers | 277/172 |
| 2,459,395 | 1/1949 | Smith | 277/216 |
| 2,798,779 | 7/1957 | Swartz et al. | 277/173 |
| 2,970,023 | 1/1961 | Thompson | 277/216 X |
| 3,237,953 | 3/1966 | Lucas | 277/172 |
| 3,618,960 | 11/1971 | Koehler | 277/216 |
| 3,727,927 | 4/1973 | Packard | 277/173 X |

FOREIGN PATENT DOCUMENTS

| 1185876 | 1/1965 | Fed. Rep. of Germany | 277/236 |
| 3305873 | 2/1984 | Fed. Rep. of Germany | . |
| 1396938 | 3/1965 | France | 277/216 |
| 136063 | 11/1976 | Japan | . |

Primary Examiner—Allan N. Shoap
Attorney, Agent, or Firm—Spencer & Frank

[57] ABSTRACT

A piston-and-ring assembly includes a piston having a circumferential groove which has an upper side wall and an opposite lower side wall; and a piston ring received in the groove and having opposite radial faces extending obliquely with respect to the side walls. The piston ring engages, with an axial bias, the upper and lower side walls with an annular marginal surface portion forming part of each radial face of the piston ring and extending substantially parallel to the side wall with which it is in engagement.

1 Claim, 1 Drawing Sheet

PISTON RING

BACKGROUND OF THE INVENTION

This invention relates to a piston ring for an internal combustion engine and is particularly of the type which, when installed in the groove of an engine piston, assumes a dished (frustoconical) configuration (similar to a Belleville spring) and engages the opposite side walls of the piston groove with portions of opposite radial ring faces under axial tension.

German Offenlegungsschrift (Non-examined Published Application) No. 3,305,873 discloses a piston ring of the above-outlined type. The piston ring engages, in the zone of its radially outer circumference, the upper side wall of the piston groove, that is, that side wall which is closer to the combustion chamber and, along the zone of its radially inner circumference, the piston ring engages the lower side wall of the piston groove, that is, that side wall which is closer to the crankcase. The piston ring engages the side walls of the piston groove along a line of contact and also engages, in the same manner, the base wall of the groove as well as the running face of the cylinder wall. By virtue of this arrangement the piston ring is incapable of displacement either in the axial or in the radial direction relative to the piston. Since the axial height of the cross-sectionally rectangular piston ring is, in its relaxed state, significantly less than that of the associated piston groove, in the installed state of the piston ring an axial tension therein is generated substantially by the twisting of the ring upon stressing in the circumferential direction. This occurrence is analagous to the known "reverse torsion" rings. By virtue of the above-noted linear contact between the piston ring and the piston groove during the operation of the engine, significant wear occurs both at the piston ring and in the corresponding zones of the piston groove.

Japanese Patent No. 136,063 seeks to cure the above-outlined problem by disclosing a piston ring of the above-outlined type which, at least in its zones cooperating with the side walls of the piston groove, has wear-resistant properties. With such an arrangement, to be sure, the problem of piston ring wear may be resolved, but the problem of groove wear persists: in fact, risks are high that the hardened zones of the piston ring will entrench into the side walls of the piston groove even more rapidly than before.

SUMMARY OF THE INVENTION

It is an object of the invention to provide an improved piston ring of the above-outlined type in which the wear between the piston ring and the side walls of the piston groove is reduced to a minimum while highly satisfactory sealing behavior and increased service life are ensured.

This object and others to become apparent as the specification progresses, are accomplished by the invention, according to which, briefly stated, those annular surface portions of the piston ring faces which are in engagement with the side walls of the piston groove are oriented at an angle (that is, they are bevelled) to the remainder of the respective piston ring face such that they extend at least approximately parallel to the respective piston groove side wall. This measure ensures that the wear during engine operation is significantly reduced between the cooperating surfaces of the piston ring and the ring groove.

"Reverse torsion" piston rings as disclosed, for example, in U.S. Pat. No. 2,798,779 are so designed that they frictionally engage the ring groove by virtue of inner twisting forces when compressed by the cylinder walls into the piston groove. Such a twisting behavior, however, is not uniform along the engine circumference of the ring, but decreases from the back of the ring towards the abutting ring ends. During operation of the engine it may thus occur that such a ring, because of the difference in forces derived from mass and gas pressure is axially still stressed in the zone of the ring back (that is, in the zone which is diametrically opposite the abutting ends), while the abutting ends begin to flutter and partially entrench themselves into the piston. This is caused, on the one hand, by the ring contour and, on the other hand, by the axial clamping within the groove, whereby the ring is prevented from turning with respect to the piston.

In contradistinction, the piston ring according to the invention, having a dished, frustoconical configuration—similar to a Belleville spring—engages the lateral walls of the piston groove uniformly along its circumference so that a flutter effect at the abutting ends of the piston ring cannot occur and further, the invention prevents any penetration of the ring into the piston groove. The forces derived from the gas pressure and the masses (for example, during idling run of the engine) are incapable of pressing the ring against the lower groove side and thus permit a rotary motion of the ring in the circumferential direction relative to the piston.

According to a further feature of the invention, the axial height of the piston ring measured in the zone of the annular surface portions—which extend substantially parallel to one another—is, in the non-installed state greater than the axial height of the associated piston groove. For making a piston ring which has a Belleville spring-like cross section, conventionally a piston ring of rectangular cross section is used which is deformed into its new shape by thermal stressing. A disadvantage which may be involved in such a ring is that the ring does not engage the side walls of the piston groove uniformly along its entire circumference. In contradistinction, an axial stress of the piston ring according to the invention—which is of rectangular cross section in the initial state—is generated by axially compressing the piston ring and introducing it into the piston groove in that condition. Upon removing the earlier-applied axial forces, the piston ring, by virtue of its contour, automatically lies against the corresponding side walls of the piston groove along the annular surface portions provided according to the invention.

Piston rings of the type which is of concern here are conventionally installed in the piston grooves in such a manner that they engage the upper groove wall at a radially outer ring portion and they engage the lower groove wall along a radially inner ring portion. Such rings are conventionally used either exclusively as oil scraper rings or as second piston rings with an additional oil wiping function. In constructions according to the prior art, the oil is driven radially inwardly into the gap formed at the crankcase side between the lower side wall and the lower ring side by virtue of the continuous axial motion of the piston ring and thus oil penetrates into the zone between the first and the second piston rings. In order to avoid such an occurrence, according to the invention the radially inner annular bevelled surface portion engages the upper groove wall and the radially outer annular bevelled surface portion engages the lower groove wall. Such a reversed construction prevents the penetration of the oil into the zone of the piston groove since with such an arrangement the above-discussed gap is eliminated.

According to a further feature of the invention, the radial width of the bevelled annular surface portions is smaller than one-half of the radially measured wall thickness of the piston ring and is preferably between 0.1 and 1 mm.

According to still another feature of the invention, the running face (that is, the outer peripheral surface) of the piston ring is so constructed that it conically tapers in an axial direction, towards the top of the piston, starting from the radially outer bevelled annular surface portion. Further, the inner peripheral surface of the piston ring extends parallel to the piston axis. In this manner, a non-uniform ring cross section is obtained which, on the one hand, ensures that a relatively sharp oil wiping edge is formed and on the other hand, ensures that the axial tension of the ring may be further increased by the asymmetrical force introduction in the zone of the running face of the piston.

According to still another feature of the invention, the opposite radial faces of the piston extend—apart from the bevelled annular surface portion—parallel to one another and form an angle of 170°-179° with the associated bevelled annular surface portions, dependent on the particular mode of application.

The invention further relates to a method of making a piston ring as outlined above, comprising the step of deforming the originally rectangular cross section of the piston ring into an oblique parallelogram by heat treatment and to subsequently machine the diagonally opposite marginal annular surfaces zones of the two radial piston faces to provide the bevelled surface portions. Such a piston ring is capable of twisting in the groove similarly to a "reverse torsion" ring.

According to another embodiment of the method of the invention, the opposite radial faces of a cross-sectionally rectangular piston ring are machined such that diagonally opposite bevelled portions are preserved from the original rectangular surface. Thus, the piston ring face to be oriented towards the piston top, starting from the running face (outer axial peripheral face) and the piston ring face oriented towards the piston bottom, starting from the inner axial peripheral face are machined, preferably by grinding, in such a manner that the cross section of the piston ring will have an oblique parallelogram shape. The pressing force of the piston ring against the side walls of the piston groove may be set arbitrarily by the selection of the angle of the oblique parallelogram in wide limits, while taking into consideration the axial height of the piston groove and the piston ring.

DESCRIPTION OF THE PREFERRED EMBODIMENTS

Figure 1:
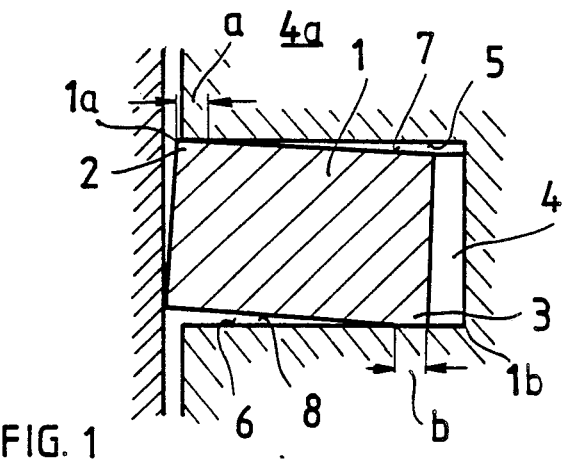
FIG. 1 is an axial sectional view of a preferred embodiment on a significantly enlarged scale in one mode of installation.

Turning to FIG. 1, there is illustrated a piston ring 1, the cross section of which approximately corresponds to that shown in Japanese Patent No. 136,063. This cross-sectional configuration is obtained by thermally stressing a cross-sectionally rectangular piston ring before installation in such a manner that it assumes a symmetrical cross-sectional configuration similar to that of a Belleville spring. The axial height of the piston ring measured at diagonally opposite corner zones 2 and 3 approximately corresponds to the axial height of the groove 4 of piston 4a. The piston groove 4 has a rectangular cross-sectional configuration, having parallel extending lateral walls 5 (upper groove wall) and 6 (lower groove wall). Upon inserting the piston ring 1 into the piston groove 4 and tensioning it in the circumferential direction, the piston ring 1 is twisted and thus axially tensioned. In order to reduce wear in the zones of contact between the piston ring 1 and the lateral walls 5 and 6 of the piston groove 4 during operation, according to the invention the radial piston ring faces 7 and 8 are provided, for example, by grinding, with parallel bevelled annular marginal surface portions a and b which, in the installed state of the piston ring 4 extend parallel to the side walls 5 and 6, respectively. The radial dimensions of the annular portions a and b are smaller than one half of the radial thickness of the piston ring. The piston ring 1 is inserted into the annular piston groove 4 in such a manner that the radially outer bevelled annular zone a is in engagement with the upper side wall 5 and the radially inner bevelled annular portion b engages the lower side wall 6. Stated differently, the annular surface portion a lies in the plane defined by the circumferential edge 1a of the piston ring 1, while the annular surface portion b lies in the plane defined by the circumferential edge 1b of the piston ring 1, and further, the annular surface portions a and b form an obtuse angle in the range of between 170° and 179° with the respective radial piston faces 7 and 8.

Figure 2:
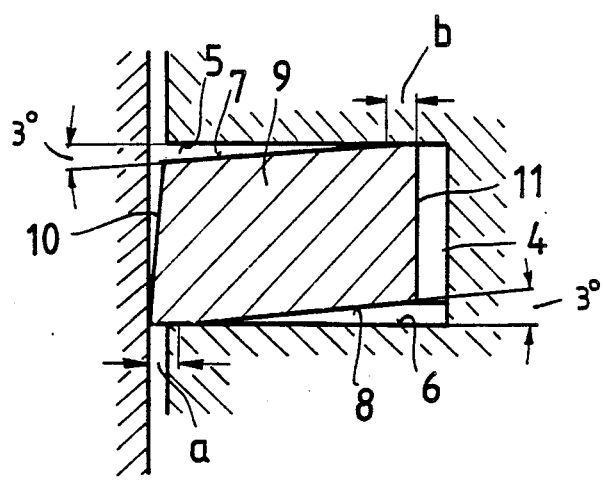
FIG. 2 is an axial sectional view of another preferred embodiment on a significantly enlarged scale in another mode of installation.

Turning now to FIG. 2, there is illustrated a piston ring 9 which has the general shape of a Belleville spring, but has an asymmetrical cross-sectional configuration. The piston ring 9 is made from a cross-sectionally rectangular piston ring by grinding the radial faces 7 and 8 at an angle of, for example, 3° to the original surface. In this manner an oblique parallelogram shape for the ring cross section is obtained. The running face 10 (that is, the outer peripheral ring surface) of the piston ring is ground to taper conically, while the inner peripheral ring surface 11 does not undergo further machining. The radial faces 7 and 8 are, however, not ground over their entire radial dimensions, but only to an extent that bevelled marginal annular parts a, b with predetermined radial dimensions (for example, 2 mm) remain. Thus, the zones a, b represent remaining portions of the original cross section. In this condition, the axial height of the piston ring 9 is slightly greater than that of the annular piston groove 4 measured at the diagonally opposite bevelled marginal annular surface parts a, b. The piston ring 9 is then inserted into the piston groove 4 in such a manner that it undergoes axial tensioning. By virtue of the generally oblique parallelogram shape of the piston ring cross section, the axial height of the piston ring is reduced and it may then be inserted into the annular piston groove 4. In the relaxed state the flattened parts a, b engage the respective side walls 5 and 6 of the annular piston groove 4 under axial bias. In contradistinction to the FIG. 1 embodiment, in the FIG. 2 construction the radially outer bevelled part a thus engages the lower groove wall, while the radially inner bevelled part b engages the upper groove wall.

It will be understood that the above description of the present invention is susceptible to various modifications, changes and adaptations, and the same are intended to be comprehended within the meaning and range of equivalents of the appended claims.

What is claimed is:

1. In a piston-and-ring assembly including a piston having a circumferential groove of rectangular cross section having an upper sidewall and an opposite lower sidewall; a piston ring received in said groove and having opposite radial faces extending obliquely with respect to said sidewalls; the improvement wherein said piston ring simultaneously engages, with an axial bias, both said upper and lower sidewalls with a respective annular marginal surface portion forming part of each said radial face of said piston ring and extending substantially parallel to the sidewall with which it is in engagement, further wherein said piston ring has a radially measured thickness, and each said annular marginal surface portion has a radially measured width which is less than one half smaller than said thickness, further wherein the annular marginal surface portion of one of said radial faces is situated at a radially inner circumferential edge of said one radial face and is in engagement with said upper sidewall, and the annular marginal surface portion of the other radial face is situated at a radially outer circumferential edge of said other radial face and is in engagement with said lower sidewall.

* * * * *